(12) United States Patent
Sobel et al.

(10) Patent No.: US 9,779,234 B2
(45) Date of Patent: Oct. 3, 2017

(54) SOFTWARE REPUTATION ESTABLISHMENT AND MONITORING SYSTEM AND METHOD

(75) Inventors: William E. Sobel, Jamul, CA (US); Brian Hernacki, San Carlos, CA (US)

(73) Assignee: Symantec Corporation, Mountain View, CA (US)

(*) Notice: Subject to any disclaimer, the term of this patent is extended or adjusted under 35 U.S.C. 154(b) by 1648 days.

(21) Appl. No.: 12/141,440

(22) Filed: Jun. 18, 2008

(65) Prior Publication Data

US 2009/0319998 A1  Dec. 24, 2009

(51) Int. Cl.
  *G06F 9/44* (2006.01)
  *G06F 21/55* (2013.01)
  *G06F 11/34* (2006.01)
  *G06F 11/36* (2006.01)

(52) U.S. Cl.
  CPC .......... *G06F 21/55* (2013.01); *G06F 11/3409* (2013.01); *G06F 11/3452* (2013.01); *G06F 11/3604* (2013.01); *G06F 2201/865* (2013.01)

(58) Field of Classification Search
  CPC .......... G06F 2201/865; G06F 11/3409; G06F 11/3604; G06F 11/3452
  See application file for complete search history.

(56) References Cited

U.S. PATENT DOCUMENTS

| | | | |
|---|---|---|---|
| 6,167,521 A * | 12/2000 | Smith et al. ............... 726/21 |
| 6,725,377 B1 * | 4/2004 | Kouznetsov .......... G06F 21/55 709/223 |
| 6,775,779 B1 * | 8/2004 | England et al. ............ 726/26 |
| 6,862,696 B1 * | 3/2005 | Voas et al. ............. 714/38.11 |
| 6,880,149 B2 * | 4/2005 | Cronce ................... 717/126 |
| 6,892,178 B1 * | 5/2005 | Zacharia .................. 705/7.29 |
| 6,990,534 B2 * | 1/2006 | Mikhailov ........ G06F 17/30861 707/E17.107 |
| 7,181,768 B1 * | 2/2007 | Ghosh et al. ............... 726/23 |
| 7,185,367 B2 * | 2/2007 | Munson .................... 726/23 |
| 7,191,438 B2 * | 3/2007 | Bryant .................. G06F 8/60 709/225 |
| 7,305,663 B1 * | 12/2007 | McGuire et al. .......... 717/130 |
| 7,464,158 B2 * | 12/2008 | Albornoz ................. 709/224 |
| 7,487,545 B2 * | 2/2009 | Hall et al. .................. 726/25 |
| 7,490,066 B2 * | 2/2009 | Kronenberg ........ H04L 12/2602 705/50 |
| 7,490,073 B1 * | 2/2009 | Qureshi ................ G06N 5/048 706/50 |

(Continued)

OTHER PUBLICATIONS

Sven Bugiel et al., Scalable Trust Establishment with Software Reputation, ACM, 2011, retrieved online on Jul. 13, 2017, pp. 15-23. Retrieved from the Internet: <URL: http://delivery.acm.org/10.1145/2050000/2046587/p15-bugiel.pdf?ip=151.207.250.61&id=2046587&acc=ACTIVE%20SERVICE&key=C15944E53D0ACA63%2E4D4702B0C3E38B35%2E4D4702B0C3E38B35%2E4D4702B0C3>.*

(Continued)

*Primary Examiner* — Hanh T Bui
(74) *Attorney, Agent, or Firm* — Wilmer Cutler Pickering Hale and Dorr LLP

(57) ABSTRACT

Knowledge of a module's behavior when the module's reputation is formed is obtained. If the module's behavior changes, this change is detected. In one embodiment, upon a determination that the module's behavior has changed, the module's original reputation is lost. In this manner, malicious trusted modules are detected and defeated.

17 Claims, 3 Drawing Sheets

(56) References Cited

U.S. PATENT DOCUMENTS

| | | | |
|---|---|---|---|
| 7,506,330 B2* | 3/2009 | Alexander, III | G06F 11/3604 717/157 |
| 7,827,534 B2* | 11/2010 | Vetillard et al. | 717/126 |
| 7,984,304 B1* | 7/2011 | Waldspurger et al. | 713/187 |
| 8,024,807 B2* | 9/2011 | Hall et al. | 726/25 |
| 8,646,072 B1* | 2/2014 | Savant | G06F 21/51 709/229 |
| 9,065,845 B1* | 6/2015 | Savant | G06F 21/51 |
| 2002/0138755 A1* | 9/2002 | Ko | 713/201 |
| 2002/0174422 A1* | 11/2002 | Kelley et al. | 717/178 |
| 2002/0194490 A1* | 12/2002 | Halperin et al. | 713/200 |
| 2003/0149888 A1* | 8/2003 | Yadav | 713/200 |
| 2003/0200462 A1* | 10/2003 | Munson | 713/200 |
| 2004/0019832 A1* | 1/2004 | Arnold et al. | 714/38 |
| 2004/0078723 A1* | 4/2004 | Gross | G06F 11/3476 714/47.2 |
| 2004/0111713 A1* | 6/2004 | Rioux | 717/137 |
| 2004/0205419 A1* | 10/2004 | Liang et al. | 714/57 |
| 2005/0086500 A1 | 4/2005 | Albornoz | |
| 2005/0091192 A1* | 4/2005 | Probert et al. | 707/1 |
| 2005/0120054 A1* | 6/2005 | Shulman et al. | 707/104.1 |
| 2005/0120341 A1* | 6/2005 | Blumenthal et al. | 717/158 |
| 2005/0183074 A1* | 8/2005 | Alexander, III | G06F 11/3604 717/131 |
| 2005/0188215 A1* | 8/2005 | Shulman et al. | 713/188 |
| 2005/0262086 A1* | 11/2005 | Ta et al. | 707/9 |
| 2005/0268338 A1* | 12/2005 | Made | 726/24 |
| 2006/0129382 A1* | 6/2006 | Anand et al. | 704/9 |
| 2006/0150163 A1* | 7/2006 | Chandane | G06F 11/3612 717/128 |
| 2006/0212925 A1* | 9/2006 | Shull et al. | 726/1 |
| 2007/0044151 A1* | 2/2007 | Whitmore | 726/23 |
| 2007/0107052 A1* | 5/2007 | Cangini et al. | 726/22 |
| 2007/0168987 A1* | 7/2007 | Vetillard et al. | 717/126 |
| 2007/0174249 A1* | 7/2007 | James | 707/3 |
| 2007/0180522 A1* | 8/2007 | Bagnall | 726/22 |
| 2007/0240138 A1* | 10/2007 | Chess et al. | 717/143 |
| 2008/0016339 A1* | 1/2008 | Shukla | 713/164 |
| 2008/0127107 A1* | 5/2008 | Kosche et al. | 717/128 |
| 2008/0222717 A1* | 9/2008 | Rothstein | H04L 63/1416 726/14 |
| 2009/0083731 A1* | 3/2009 | Sobel | G06F 21/577 717/177 |
| 2009/0165133 A1* | 6/2009 | Hwang et al. | 726/22 |
| 2011/0231381 A1* | 9/2011 | Mercuri | G06F 17/30864 707/706 |

OTHER PUBLICATIONS

Sobel, U.S. Appl. No. 11/860,060, filed Sep. 24, 2007, entitled "Software Publisher Trust Extension Application".

"User Account Control", pp. 1-7 [online]. Retrieved on May 1, 2008 from the Internet: <URL:http://en.wikipedia.org/wiki/User_Account_Control>. No author provided.

* cited by examiner

SOFTWARE REPUTATION ESTABLISHMENT AND MONITORING SYSTEM AND METHOD

BACKGROUND

Field of the Invention

The present invention relates to computer system security. More particularly, the present invention relates to a system and method of establishing and monitoring trust of a module of a computer system.

Description of the Related Art

A behavior blocking system heuristically monitors modules and blocks suspicious behavior that the behavior blocking system considers as malicious based on the trust level of the module. Accordingly, assessing the trust level of a module is very important in behavior blocking.

SUMMARY OF THE INVENTION

In accordance with one embodiment, knowledge of a module's behavior when the module's reputation is formed is obtained. If the module's behavior changes, this change is detected. In one embodiment, upon a determination that the module's behavior has changed, the module's original reputation is lost. In this manner, malicious trusted modules are detected and defeated.

Embodiments are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 2:
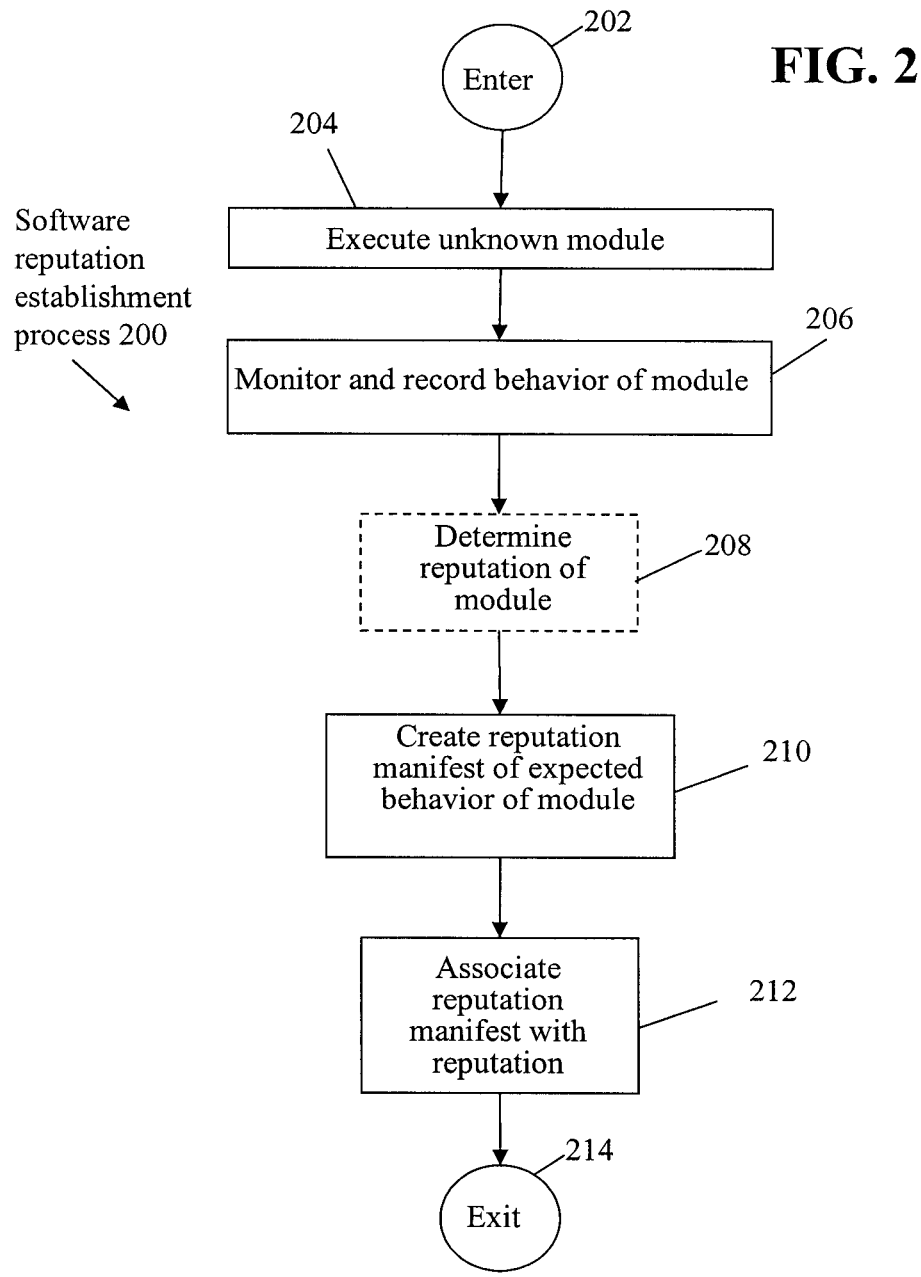
FIG. 2 is a flow diagram of a software reputation establishment process in accordance with one embodiment.
Figure 3:
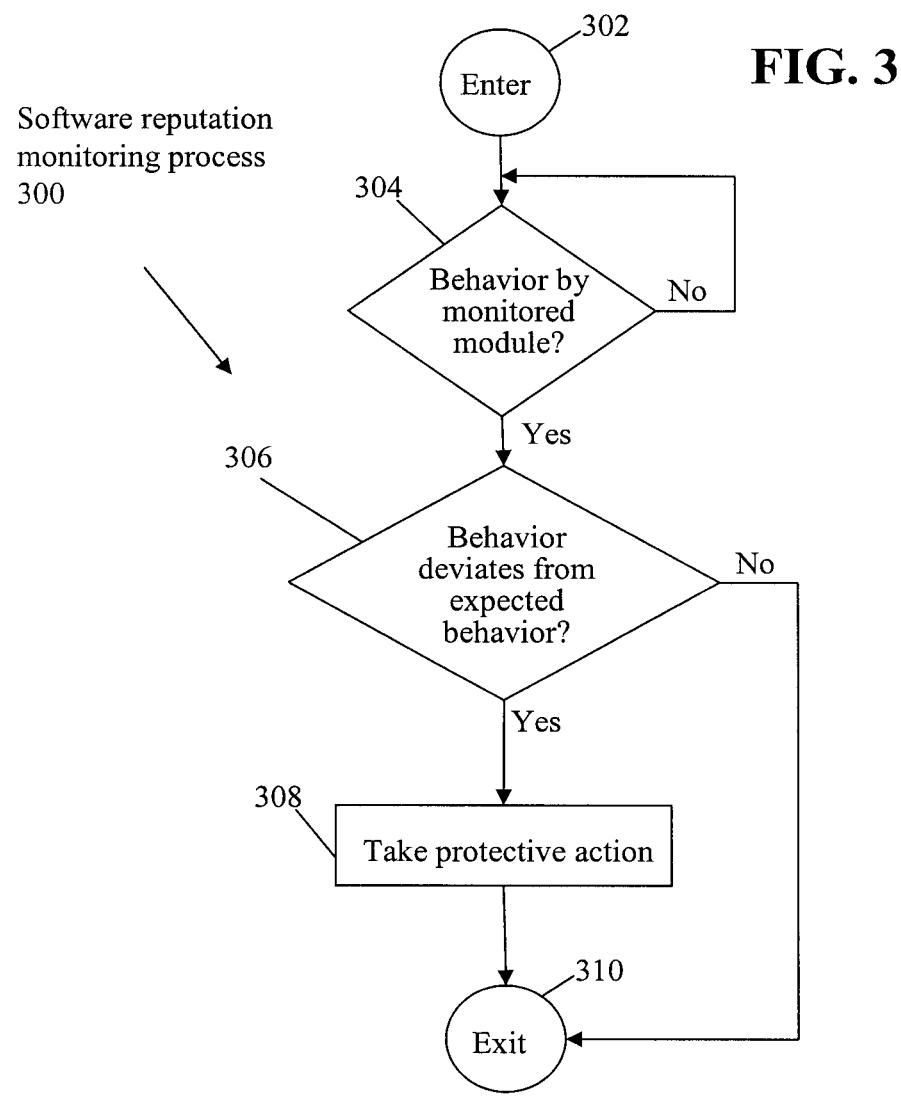
FIG. 3 is a flow diagram of a software reputation monitoring process in accordance with one embodiment.

In accordance with one embodiment, knowledge of a module's behavior when the module's reputation is formed is obtained in a CREATE REPUTATION MANIFEST OF EXPECTED BEHAVIOR OF MODULE OPERATION 210 (FIG. 2). If the module's behavior changes, this change is detected in a BEHAVIOR DEVIATES FROM EXPECTED BEHAVIOR CHECK OPERATION 306 (FIG. 3). In one embodiment, upon a determination that the module's behavior has changed, the module's original reputation is lost in a TAKE PROTECTIVE ACTION OPERATION 308 (FIG. 3). In this manner, malicious trusted modules are detected and defeated.

Figure 1:
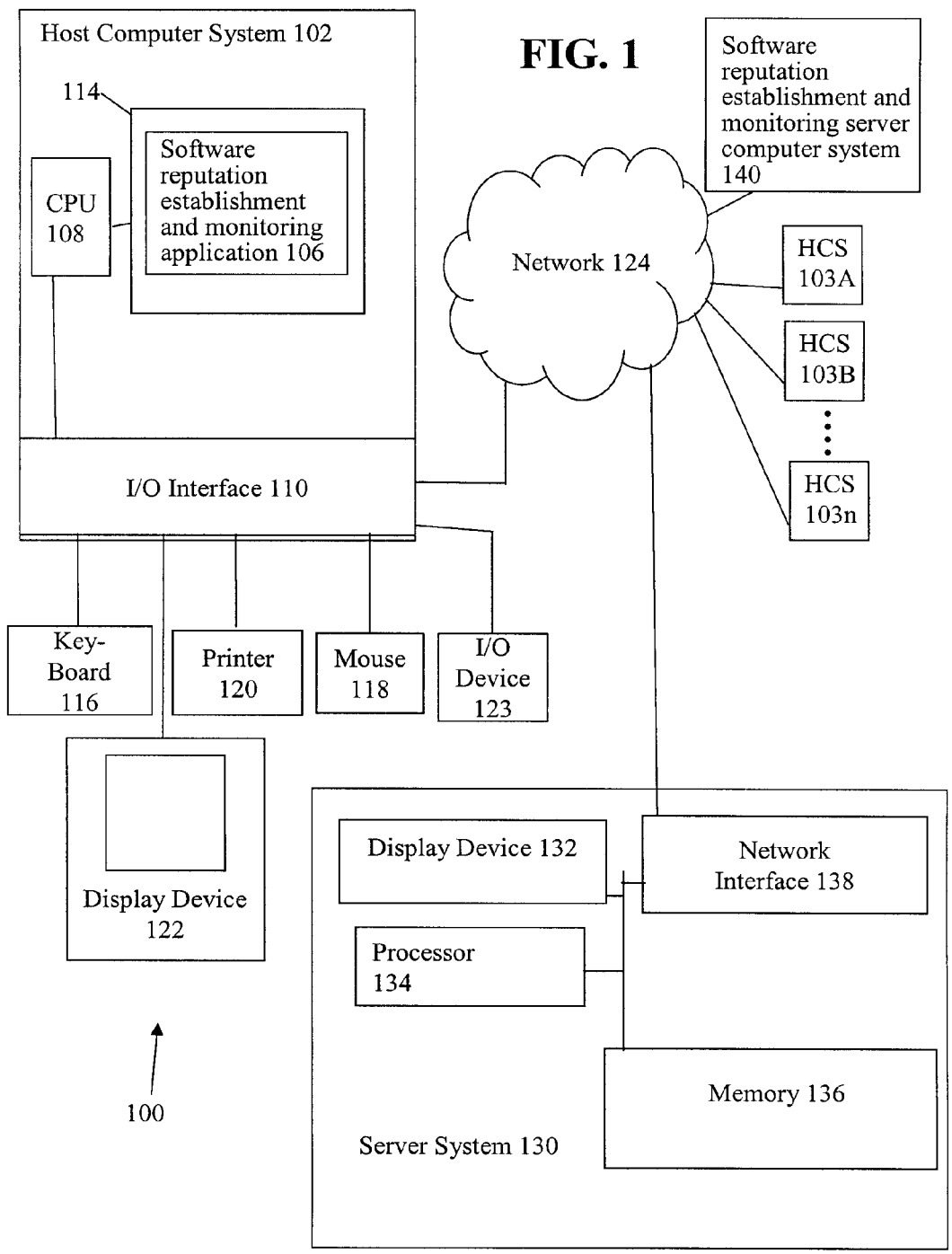
FIG. 1 is a diagram of a client-server system that includes a software reputation establishment and monitoring application executing on a host computer system in accordance with one embodiment.

More particularly, FIG. 1 is a diagram of a client-server system 100 that includes a software reputation establishment and monitoring application 106 executing on a host computer system 102 in accordance with one embodiment.

Host computer system 102, sometimes called a client or user device, typically includes a central processing unit (CPU) 108, sometimes called a processor 108, an input/output (I/O) interface 110, and a memory 114. Host computer system 102 further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from host computer system 102.

In one embodiment, software reputation establishment and monitoring application 106 is loaded into host computer system 102 via I/O device 123, such as from a CD, DVD, or floppy disk containing software reputation establishment and monitoring application 106.

Host computer system 102 is coupled to a server system 130 of computer system 100 by a network 124. Server system 130 typically includes a display device 132, a processor 134, a memory 136, and a network interface 138.

Host computer system 102 is also coupled to a plurality of host computer systems 103A, 103B, . . . , 103n, collectively host computer systems 103, similar to host computer system 102 by network 124. Further, host computer system 102 is coupled to a software reputation establishment and monitoring server computer system 140, sometimes called a back end reputation system, similar to server system 130 by network 124.

Network 124 can be any network or network system that is of interest to a user. In various embodiments, network interface 138 and I/O interface 110 include analog modems, digital modems, or a network interface card.

Software reputation establishment and monitoring application 106 is stored, for example, in memory 114 of host computer system 102 and executed on host computer system 102.

The particular type of and configuration of host computer system 102, host computer systems 103, software reputation establishment and monitoring server computer system 140, and server system 130 are not essential to this embodiment.

Herein, in one embodiment, malicious code is defined as any computer program, module, set of modules, or code that enters a computer system environment without an authorized user's knowledge and/or without an authorized user's consent.

FIG. 2 is a flow diagram of a software reputation establishment process 200 in accordance with one embodiment. Referring now to FIGS. 1 and 2 together, in one embodiment, execution of software reputation establishment and monitoring application 106 by processor 108 results in the operations of software reputation establishment process 200 as described below.

From an ENTER OPERATION 202, flow moves to an EXECUTE UNKNOWN MODULE OPERATION 204. In EXECUTE UNKNOWN MODULE OPERATION 204, an unknown module, sometimes called software, is executed.

Generally, a module includes executable code. In one embodiment, a module is part of an application. For example, a module is a plugin to the Internet Explorer® application, for example, is an Adobe® Flash® module. In yet another embodiment, a module is an entire application.

In one embodiment, an application is a program or group of programs designed for end-users. More particularly, applications (also called end-user programs) include database programs, word processors, and spreadsheets, although there are many different types of applications.

In one embodiment, an application and/or module is an executable file. An executable file is a file who's contents are meant to be interpreted as a program by a computer. In one example, an executable file has a .exe extension (an EXE file) but has other extensions such as net in other embodiments. An application and/or module is executed using any one of a number of techniques as will be recognized by one of ordinary skill in the art having the benefit of this disclosure, and the particular technique used is not essential to this embodiment.

As used herein, a module is either a known module or an unknown module. A known module is a module that has an associated reputation manifest as discussed further below. In contrast, an unknown module is a module that does not have an associated reputation manifest.

For EXECUTE UNKNOWN MODULE OPERATION 204, flow moves to a MONITOR AND RECORD BEHAVIOR OF MODULE OPERATION 206.

In MONITOR AND RECORD BEHAVIOR OF MODULE OPERATION 206, the behavior, sometimes called actions, of the executed module is monitored and recorded. More particularly, upon executing the unknown module in EXECUTE UNKNOWN MODULE OPERATION 204, the unknown module performs actions, and these actions are referred to as behavior. Illustrative behavior of a module include: (1) whether the module changes system wide settings; (2) what type of files are accessed by the module; (3) whether the module is a startup program; and (4) any other behavior of the module of interest. Illustratively, which behavior is monitored and recorded is configurable, e.g., by a user or system administrator.

In one embodiment, the module is executed, monitored and recorded in several different installations, e.g., on different computer systems and/or operating systems. For example, the module is executed, monitored and recorded on host computer systems 102, 103. At each installation, the behavior of the module is monitored and recorded. The recorded behavior of the module as well as the characteristics of the installation is collected from each installation, e.g., at a back end reputation system such as software reputation establishment and monitoring server computer system 140, and aggregated.

In another embodiment, the module is executed, monitored and recorded at a single installation, e.g., on a single computer system such as host computer system 102 and/or on a single operating system.

From MONITOR AND RECORD BEHAVIOR OF MODULE OPERATION 206, flow moves, optionally, to a DETERMINE REPUTATION OF MODULE OPERATION 208. In DETERMINE REPUTATION OF MODULE OPERATION 208, the reputation of the module is determined, e.g., from the monitored and recorded behavior of the module. In one embodiment, once enough copies of the module have been monitored and recorded, the module has been executed for a sufficient amount of time, and/or the behavior for the module has otherwise been sufficiently observed, the reputation for the module is established.

A reputation is the overall trustworthiness of the module as determined by a security vendor or security product. A reputation is measured by a reputation score in one embodiment, although can be measured using any one of a number of techniques as will be recognized by one of ordinary skill in the art having the benefit of this disclosure, and the particular technique used is not essential.

In one embodiment, the privileges of a module are directly related to the module's reputation. The more trusted is the module, the greater are the privileges afforded to the module.

To illustrate, if a module is found to install spyware, viruses, Trojan horses, or other malicious code, the module is determined to be untrustworthy, i.e., the trustworthiness of the module is that the module is untrustworthy. Conversely, if a module is found to be safe, the module is determined to be trustworthy (trusted), i.e., the trustworthiness of the module is that the module is trustworthy. Although two examples of trustworthiness are provided, trustworthiness can be defined with a great degree of granularity such that there are many levels of trustworthiness (trust).

In another embodiment, the reputation of the module is based on criteria other than the monitored and recorded behavior of the module and thus DETERMINE REPUTATION OF MODULE OPERATION 208 is an optional operation. To illustrate, assume the case where a software publisher publishes legitimate modules for a period of time. In accordance with this example, if the module has been published by this same software publisher, the module is identified as being trustworthy, i.e., the reputation for the module is that the module is trusted.

In accordance with another example, assume the case where an established legitimate software publisher, e.g., Microsoft® Corporation, publishes the module. As the module is published by an established legitimate software publisher, the module is identified as being trustworthy, i.e., the reputation for the module is that the module is trusted.

Accordingly, the reputation of the module is established in DETERMINE REPUTATION OF MODULE OPERATION 208 or is established otherwise. The particular technique used to establish the reputation of a module is not essential. However, in accordance with one embodiment, as described below, the established reputation is contingent upon the module behaving the same as when the reputation was established.

From DETERMINE REPUTATION OF MODULE OPERATION 208 (or from MONITOR AND RECORD BEHAVIOR OF MODULE OPERATION 206 in the event that DETERMINE REPUTATION OF MODULE OPERATION 208 is not performed), flow moves to a CREATE REPUTATION MANIFEST OF EXPECTED BEHAVIOR OF MODULE OPERATION 210. In CREATE REPUTATION MANIFEST OF EXPECTED BEHAVIOR OF MODULE OPERATION 210, a reputation manifest of expected behavior of the module is created based on the monitored and recorded behavior of the module (OPERATION 206).

More particularly, the expected behavior of the module is the behavior of the module monitored and recorded in MONITOR AND RECORD BEHAVIOR OF MODULE OPERATION 206. Stated another way, the expected behavior of the module is the observed normal behavior of the module.

A reputation manifest is a collection, e.g., list, of the expected behavior of the module. Illustratively, in accordance with the example above, the reputation manifest includes: (1) system wide settings that are changed by the module, if any; (2) the types of files that are accessed by the module, if any; (3) that the module is a startup program, if true; and (4) any other monitored and recorded behavior of the module.

From CREATE REPUTATION MANIFEST OF EXPECTED BEHAVIOR OF MODULE OPERATION 210, flow moves to an ASSOCIATE REPUTATION MANIFEST WITH REPUTATION OPERATION 212. In ASSOCIATE REPUTATION MANIFEST WITH REPUTATION OPERATION 212, the reputation manifest created in CREATE REPUTATION MANIFEST OF EXPECTED BEHAVIOR OF MODULE OPERATION 210 is associated with the established reputation of the module. More particularly, the established reputation is associated, i.e., linked, with the expected behavior of the module.

As demonstrated below in reference to software reputation monitoring process 300 of FIG. 3, as long as the module behaves in accordance with the expected behavior in the reputation manifest, the module maintains the established reputation of the module. However, maintaining the established reputation is contingent upon the module behaving in the expected manner, i.e., in accordance with the expected behavior.

In one particular embodiment, when the reputation of the module is determined in DETERMINE REPUTATION OF MODULE OPERATION 208 based on the monitored and recorded behavior of the module in MONITOR AND RECORD BEHAVIOR OF MODULE OPERATION 206, maintaining the established reputation is contingent upon the module behaving in the same manner as when the module's reputation was initially established.

Although a module is described herein as behaving in accordance with a reputation manifest, in light of this disclosure, those of skill in the art will understand this to mean that the behavior (actions) of the module are the same or substantially similar to the behavior (actions) listed or otherwise collected in the reputation manifest.

From ASSOCIATE REPUTATION MANIFEST WITH REPUTATION OPERATION 212, flow moves to and exits at EXIT OPERATION 214.

FIG. 3 is a flow diagram of a software reputation monitoring process 300 in accordance with one embodiment. Referring now to FIGS. 1 and 3 together, in one embodiment, execution of software reputation establishment and monitoring module 106 by processor 108 results in the operations of software reputation monitoring process 300 as described below.

From an ENTER OPERATION 302, flow moves to a BEHAVIOR BY MONITORED MODULE CHECK OPERATION 304. In BEHAVIOR BY MONITORED MODULE CHECK OPERATION 304 a determination is made as to whether a monitored module is taking action, i.e., whether there is behavior by a monitored module.

If there is no behavior by a monitored module, flow remains at BEHAVIOR BY MONITORED MODULE CHECK OPERATION 304. Conversely, if there is behavior by monitored module, flow moves from BEHAVIOR BY MONITORED MODULE CHECK OPERATION 304 to a BEHAVIOR DEVIATES FROM EXPECTED BEHAVIOR CHECK OPERATION 306. In BEHAVIOR DEVIATES FROM EXPECTED BEHAVIOR CHECK OPERATION 306, a determination is made as to whether the behavior of the monitored module deviates found the expected behavior of the monitored module. Stated another way, a determination is made as to whether the behavior of the module has changed from the expected behavior.

In one embodiment, a reputation and reputation manifest of expected behavior of the module are downloaded to host computer system 102, e.g., from software reputation establishment and monitoring server computer system 140. In another embodiment, the reputation and reputation manifest of expected behavior of the module are created on host computer system 102 as described above.

In one embodiment, a monitored module is a module that has an established reputation with associated reputation manifest, i.e., is expected to behave in a certain manner. Accordingly, if there is behavior by a monitored module, this behavior is compared to the expected behavior of the module in BEHAVIOR DEVIATES FROM EXPECTED BEHAVIOR CHECK OPERATION 306.

The behavior can be compared using any one of a number of techniques as will be recognized by one of ordinary skill in the art having the benefit of this disclosure and the particular technique used is not essential. In one embodiment, any deviation from the expected behavior is sufficient to reach a conclusion that the behavior of the monitored module deviates found the expected behavior of the monitored module. In another embodiment, a certain amount of change in behavior is allowed before a conclusion is reached that the behavior of the monitored module deviates found the expected behavior of the monitored module.

If a determination is made that the behavior does not deviate from the expected behavior, flow moves from BEHAVIOR DEVIATES FROM EXPECTED BEHAVIOR CHECK OPERATION 306 and exits at an EXIT OPERATION 310 or returns to BEHAVIOR BY MONITORED MODULE CHECK OPERATION 304. In this event, the module is behaving as expected and no further action is taken.

In contrast, if a determination is made that the behavior does deviate from the expected behavior, flow moves from BEHAVIOR DEVIATES FROM EXPECTED BEHAVIOR CHECK OPERATION 306 to a TAKE PROTECTIVE ACTION OPERATION 308. In TAKE PROTECTIVE ACTION OPERATION 308, protective action is taken, e.g., the established reputation of the module is revoked.

In one embodiment, the module loses its reputation, i.e., is assigned a lower reputation, so that the privileges associated with the original reputation are also lost or reduced. To illustrate, actions that would have been allowed for the module at the module's original reputation are subject to increased scrutiny and/or blocked based on the lower reputation, the lower reputation being that the module is less trustworthy than at the original reputation.

Further, in one embodiment, an alert that the module has lost its reputation and/or of the changed behavior of the module is generated in TAKE PROTECTIVE ACTION OPERATION 308. The alert is issued to a back end reputation system such as software reputation establishment and monitoring server computer system 140, a user, an administrator, or otherwise logged.

Based on this alert, in one embodiment, a warning that the module's reputation is unknown is issued to new users considering installation of the module. For example, the warning is issued from software reputation establishment and monitoring server computer system 140 to host computer systems 103. This allows the new users, e.g., of host computer systems 103, to make a better educated decision on whether to install the module or not.

In another embodiment, the changed behavior of the module is blocked in TAKE PROTECTIVE ACTION OPERATION 308. Although certain examples of protective action are set forth above, in light of this disclosure, those of skill in the art will understand that a wide variety of protective actions can be taken in TAKE PROTECTIVE ACTION OPERATION 308.

In certain instances, the change in behavior of the module is legitimate, i.e., is not associated with malicious code. However, the module loses its original reputation since the new behavior was not factored into the original reputation decision. In one embodiment, a new reputation is created for the module based upon and incorporating the new behavior.

In other instances, the change in behavior of the module is malicious, i.e., is associated with malicious code. To illustrate, traditionally, black-list anti-malware solution were used. More particularly, a list of known malicious code, sometimes called a black-list, was used to determine whether a module was malicious or not.

More recently, white-list anti-malware solutions are increasingly being used. More particularly, a list of known trusted modules, sometimes called a white-list, is used to determine whether a module is allowed to execute. The secure white lists provide strong identity for modules running on a system. In one example, the reputation of the contributing author of a module is attributed to the module itself.

However, a problem occurs when a trusted module, e.g., a module on a white list, turns out to the malicious, i.e., contains malicious code. This malicious trusted module problem is the invariable outcome of a system which only allows trusted modules to execute. Attackers embed malicious code into a trusted module creating a malicious trusted module to exploit the host computer system, e.g., to steal end users data and monetize that theft.

In one example, to gain the trust and confidence to be placed on the white list, attackers publish legitimate modules for some period of time. Once placed on the white list, the attackers create a malicious module that is placed on the white list based on the past record of the attacker of publishing legitimate modules.

In another example, an attacker becomes an insider to an established software company and inserts malicious code into a module of the established software company. This malicious module is placed on the white list based on the fact that the module is published by the established software company. Although a couple of examples are provided, a malicious trusted module can be created using any one of a number of techniques as will be recognized by one of ordinary skill in the art having the benefit of this disclosure, and the particular technique used is not essential.

To detect and defeat malicious trusted modules, knowledge of a module's behavior when the module's reputation is formed is obtained in CREATE REPUTATION MANIFEST OF EXPECTED BEHAVIOR OF MODULE OPERATION 210 of software reputation establishment process 200 of FIG. 2 as set forth above. If the module's behavior changes, this change is detected in BEHAVIOR DEVIATES FROM EXPECTED BEHAVIOR CHECK OPERATION 306 of software reputation monitoring process 300 of FIG. 3. In one embodiment, upon a determination that the module's behavior has changed, the module's reputation is changed, e.g., lost, in TAKE PROTECTIVE ACTION OPERATION 308 as discussed above.

As a hypothetical example, presume a software publisher creates a new image editing module Image.exe. The new image editing module Image.exe does not have an assigned reputation manifest of expected behavior of the module and thus is an unknown module.

Accordingly, referring again to FIG. 2, the image editing module Image.exe is executed in EXECUTE UNKNOWN MODULE OPERATION 204, and the behavior is monitored and recorded in MONITOR AND RECORD BEHAVIOR OF MODULE OPERATION 206. Illustratively, the new image editing module Image.exe does not make changes to host computer system 102 which require User Account Control (UAC) approval and only modifies image files.

Based on this behavior, the image editing module Image.exe is determined to be a trusted module in DETERMINE REPUTATION OF MODULE OPERATION 208. A reputation manifest of expected behavior, i.e., the behavior monitored and recorded in MONITOR AND RECORD BEHAVIOR OF MODULE OPERATION 206, of the image editing module Image.exe is created in CREATE REPUTATION MANIFEST OF EXPECTED BEHAVIOR OF MODULE OPERATION 210. The reputation manifest is associated with the reputation in ASSOCIATE REPUTATION MANIFEST WITH REPUTATION OPERATION 212.

Referring now to FIG. 3, during use of the image editing module Image.exe, a determination is made that the image editing module Image.exe behavior has changed in BEHAVIOR DEVIATES FROM EXPECTED BEHAVIOR CHECK OPERATION 306. Illustratively, malicious code within the image editing module Image.exe, i.e., a malicious trusted module, hooks system services and changes system files.

However, this malicious behavior is blocked and an alert is issued in TAKE PROTECTIVE ACTION OPERATION 308. As this example demonstrates, malicious trusted modules are detected and defeated in accordance with various embodiments.

Referring again to FIG. 1, although software reputation establishment and monitoring application 106 is referred to as an application, this is illustrative only. Software reputation establishment and monitoring application 106 should be capable of being called from an application or the operating system. In one embodiment, an application is generally defined to be any executable code. Moreover, those of skill in the art having the benefit of this disclosure will understand that when it is said that an application or an operation takes some action, the action is the result of executing one or more instructions by a processor.

While embodiments have been described for a client-server configuration, an embodiment is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a tangible storage medium configured to store computer readable code in accordance with an embodiment. Some examples of computer program products are CD-ROM discs, DVDs, ROM cards, floppy discs, magnetic tapes, computer hard drives, and servers on a network As illustrated in FIG. 1, this medium belongs to the computer system itself. However, the medium is also removed from the computer system. For example, software reputation establishment and monitoring application 106 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that execute software reputation establishment and monitoring application 106 in accordance with at least one of the embodiments as described herein. Similarly, in another embodiment, host computer system 102 and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, software reputation establishment and monitoring application 106 in accordance with one embodiment can be implemented in a wide variety of computer system configurations. In addition, software reputation establishment and monitoring application 106 could be stored as different modules in memories of different devices. For example, software reputation establishment and monitoring application 106 could initially be stored in server system 130, and as necessary, a portion of software reputation establishment and monitoring application 106 could be transferred to host computer system 102 and executed on host computer system 102. Consequently, part of the software reputation establishment and monitoring functionality would be executed on processor 134 of server system 130, and another part would be executed on processor 108 of host computer system 102. In view of this disclosure, those of skill in the art can implement various embodiments in a wide variety of physical hardware configurations using an operating system and computer programming language of interest to the user.

In yet another embodiment, software reputation establishment and monitoring application 106 is stored in memory 136 of server system 130. Software reputation establishment and monitoring application 106 is transferred over network 124 to memory 114 in host computer system 102. In this embodiment, network interface 138 and I/O interface 110 would include analog modems, digital modems, or a network interface card. If modems are used, network 124 includes a communications network, and software reputation establishment and monitoring application 106 is downloaded via the communications network.

This disclosure provides exemplary embodiments. The scope is not limited by these exemplary embodiments. Numerous variations, whether explicitly provided for by the specification or implied by the specification or not, may be implemented by one of skill in the art in view of this disclosure.

What is claimed is:

1. A system comprising:
one or more memories having collectively stored therein a software reputation establishment and monitoring application; and
one or more processors coupled to the one or more memories, wherein execution of said software reputation establishment and monitoring application generates a method comprising:
recording behavior of a module executing on a first computing system and characteristics of the first computing system, said recorded behavior being an expected behavior of said module on the first computing system, wherein said expected behavior is determined based upon previous behavior of said module;
creating a reputation manifest of said expected behavior, the reputation manifest comprising system settings that may be changed by said module and types of files that may be accessed by said module;
providing the recorded behavior and characteristics to a second computing system;
determining a reputation, using the second computing system and the recorded behavior and characteristics, of said module contingent upon said module behaving in accordance with said expected behavior, wherein the reputation is a measure of trustworthiness of said module as determined by the second computing system, wherein the reputation is associated with privileges afforded said module, and wherein the reputation is determined after a predetermined number of copies of said module have been monitored and recorded;
determining that a new behavior of said module deviates from said expected behavior if the new behavior deviates from said expected behavior by more than a threshold amount, wherein the threshold amount is one of a plurality of threshold amounts each associated with certain privileges afforded said module; and
taking protective action in response to the determination that the new behavior deviates from the expected behavior by more than the threshold amount.

2. The system of claim 1 further comprising associating said expected behavior with said reputation of said module.

3. The system of claim 2 wherein said associating said expected behavior with a reputation of said module comprises associating said reputation manifest with said reputation.

4. The system of claim 3 wherein said reputation manifest is a collection of said expected behavior.

5. The system of claim 1 further comprising executing said module, wherein upon said execution, said module performs said behavior.

6. The system of claim 1 wherein said behavior of said module comprises a collective and comprehensive behavior of said module at several different installations, the different installations including at least two different computing systems having different operating systems.

7. The system of claim 1 wherein said reputation is the overall trustworthiness of said module.

8. The system of claim 1 wherein upon a determination that said new behavior of said module does not deviate from said expected behavior, said computer-implemented method further comprising taking no further action.

9. The system of claim 1 wherein said taking protective action comprises revoking said reputation.

10. The system of claim 9 wherein said revoking said reputation comprises assigning said module a lower reputation.

11. The system of claim 1 wherein said taking protective action comprises generating an alert that said new behavior of said module has deviated from said expected behavior.

12. The system of claim 11 wherein, based on said alert, new users considering installation of said module are issued a warning.

13. The system of claim 12 wherein said warning comprises informing said new users that said module has an unknown reputation.

14. The system of claim 1 wherein said taking protective action comprises blocking said new behavior.

15. The system of claim 1 wherein behavior includes characteristics of and actions taken by the module, and wherein actions and characteristics to be recorded are user configurable.

16. A computer-program product comprising a non-transitory computer readable storage medium containing computer program code comprising:
a software reputation establishment and monitoring application for recording behavior of an unknown module executing on a first computing system and characteristics of the first computing system, said recorded behavior being an expected behavior of said module on the first computing system, wherein said expected behavior is determined based upon previous behavior of said module;
said software reputation establishment and monitoring application further for creating a reputation manifest of said expected behavior, the reputation manifest comprising system settings that may be changed by said module and types of files that may be accessed by said module;

said software reputation establishment and monitoring application further for providing the recorded behavior and characteristics to a second computing system;

said software reputation establishment and monitoring application further for determining a reputation, using the second computing system and the recorded behavior and characteristics, of said module contingent upon said module behaving in accordance with said expected behavior, wherein the reputation is a measure of trustworthiness of said module as determined by the second computing system, wherein the reputation is associated with privileges afforded said module, and wherein the reputation is determined after a predetermined number of copies of said module have been monitored and recorded;

said software reputation establishment and monitoring application further for determining that a new behavior of said module deviates from said expected behavior if the new behavior deviates from said expected behavior by more than a threshold amount, wherein the threshold amount is one of a plurality of threshold amounts each associated with certain privileges afforded said module; and said software reputation establishment and monitoring application further for taking protective action in response to the determination that the new behavior deviates from the expected behavior by more than the threshold amount.

17. A computer implemented method comprising:

one or more memories having collectively stored therein a software reputation establishment and monitoring application; and one or more processors coupled to the one or more memories, wherein execution of said software reputation establishment and monitoring application generates a method comprising:

recording behavior of a module executing on a first computing system and characteristics of the first computing system, said recorded behavior being an expected behavior of said module on the first computing system, wherein said expected behavior is determined based upon previous behavior of said module;

creating a reputation manifest of said expected behavior, the reputation manifest comprising system settings that may be changed by said module and types of files that may be accessed by said module;

providing the recorded behavior and characteristics to a second computing system;

determining a reputation, using the second computing system and the recorded behavior and characteristics, of said module contingent upon said module behaving in accordance with said expected behavior, wherein the reputation is a measure of trustworthiness of said module as determined by the second computing system, wherein the reputation is associated with privileges afforded said module, and wherein the reputation is determined after a predetermined number of copies of said module have been monitored and recorded;

determining that a new behavior of said module deviates from said expected behavior if the new behavior deviates from said expected behavior by more than a threshold amount, wherein the threshold amount is one of a plurality of threshold amounts each associated with certain privileges afforded said module; and taking protective action in response to the determination that the new behavior deviates from the expected behavior by more than the threshold amount.

* * * * *